US010966261B2

(12) United States Patent
Hamachi

(10) Patent No.: US 10,966,261 B2
(45) Date of Patent: Mar. 30, 2021

(54) COMMUNICATION APPARATUS, COMMUNICATION METHOD, AND PROGRAM

(71) Applicant: CANON KABUSHIKI KAISHA, Tokyo (JP)

(72) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 16/036,515

(22) Filed: Jul. 16, 2018

(65) Prior Publication Data

US 2019/0037620 A1  Jan. 31, 2019

Related U.S. Application Data

(63) Continuation of application No. PCT/JP2016/089089, filed on Dec. 28, 2016.

(30) Foreign Application Priority Data

Jan. 18, 2016  (JP) .............................. JP2016-007427
Nov. 4, 2016  (JP) .............................. JP2016-216633

(51) Int. Cl.
| *H04W 76/14* | (2018.01) |
| *H04L 29/06* | (2006.01) |
| *G06K 19/06* | (2006.01) |
| *H04N 5/232* | (2006.01) |
| *H04W 12/00* | (2009.01) |

(Continued)

(52) U.S. Cl.
CPC ...... *H04W 76/14* (2018.02); *G06K 19/06037* (2013.01); *H04L 63/0428* (2013.01); *H04L 63/0442* (2013.01); *H04L 63/083* (2013.01);

*H04N 5/232* (2013.01); *H04W 12/003* (2019.01); *H04W 12/02* (2013.01);
(Continued)

(58) Field of Classification Search
None
See application file for complete search history.

(56) References Cited

U.S. PATENT DOCUMENTS 8,572,698 B1 * 10/2013 Kandasamy .......... H04W 12/06
370/328
10,129,499 B1 * 11/2018 Boone .................... H04L 9/0662
(Continued)

FOREIGN PATENT DOCUMENTS

| CN | 102932401 A | 2/2013 |
| CN | 103384369 A | 11/2013 |

(Continued)

*Primary Examiner* — Ayaz R Sheikh
*Assistant Examiner* — Tarell A Hampton
(74) *Attorney, Agent, or Firm* — Canon U.S.A., Inc., IP Division

(57) ABSTRACT

A communication apparatus determines whether the communication apparatus plays a role of capturing an image based on predetermined information indicating whether a communication partner apparatus plays the role of capturing an image in a sharing process executed based on the predetermined information which is supplied to establish from the captured image, and establishes the wireless connection with the communication partner apparatus by Wi-Fi Direct based on the communication parameters shared by the sharing process with the communication partner apparatus in accordance with the determination.

9 Claims, 12 Drawing Sheets

(51) Int. Cl.
*H04W 12/06* (2009.01)
*H04W 12/02* (2009.01)
*H04W 88/04* (2009.01)
*H04W 8/00* (2009.01)

(52) U.S. Cl.
CPC ............ *H04W 12/06* (2013.01); *H04W 8/005* (2013.01); *H04W 88/04* (2013.01)

(56) References Cited

U.S. PATENT DOCUMENTS

| | | | | |
|---|---|---|---|---|
| 2007/0239877 A1* | 10/2007 | Uchida | ............... | H04M 1/7253 709/228 |
| 2009/0029725 A1* | 1/2009 | Gerard Kindberg | ... | G06Q 30/02 455/466 |
| 2009/0227282 A1* | 9/2009 | Miyabayashi | ...... | H04L 63/0492 455/552.1 |
| 2010/0146129 A1* | 6/2010 | Nakahara | .............. | H04W 48/12 709/228 |
| 2012/0133971 A1* | 5/2012 | Park | ................... | H04N 1/00127 358/1.15 |
| 2012/0147799 A1* | 6/2012 | Nagara | .............. | H04N 21/4305 370/310 |
| 2012/0218918 A1* | 8/2012 | Takae | .................. | H04W 8/005 370/255 |
| 2012/0322368 A1* | 12/2012 | Desai | .................... | H04W 12/02 455/41.1 |
| 2013/0034023 A1* | 2/2013 | Jung | ..................... | H04L 67/104 370/255 |
| 2013/0040576 A1* | 2/2013 | Yoon | .................... | H04W 8/005 455/41.2 |
| 2013/0050259 A1* | 2/2013 | Ahn | ...................... | G06F 3/1454 345/633 |
| 2013/0057897 A1* | 3/2013 | Park | ...................... | G06F 21/608 358/1.14 |
| 2013/0148162 A1* | 6/2013 | Park | ................... | H04N 1/00214 358/1.15 |
| 2013/0331028 A1* | 12/2013 | Kuehnel | ............... | H04W 76/10 455/41.1 |
| 2013/0337857 A1* | 12/2013 | Hassan | ................. | H04W 28/16 455/509 |
| 2014/0045472 A1* | 2/2014 | Sharma | .................. | H04W 4/08 455/416 |
| 2014/0087654 A1* | 3/2014 | Kiveisha | .............. | H04B 5/0031 455/41.1 |
| 2014/0122563 A1* | 5/2014 | Singh | ..................... | H04L 67/34 709/203 |
| 2014/0169221 A1* | 6/2014 | Cha | ..................... | H04L 41/0806 370/255 |
| 2014/0269646 A1* | 9/2014 | Ramasamy | ........... | H04W 76/14 370/338 |
| 2014/0287690 A1* | 9/2014 | Kim | ........................ | H04W 4/80 455/41.3 |
| 2014/0320908 A1* | 10/2014 | Iwauchi | .................. | H04L 45/24 358/1.15 |
| 2014/0342665 A1* | 11/2014 | Amano | ................. | H04W 76/14 455/41.1 |
| 2015/0023649 A1* | 1/2015 | Wang | ............... | H04N 21/43637 386/231 |
| 2015/0155917 A1* | 6/2015 | Won | .................... | H04M 1/7253 455/41.1 |
| 2015/0163300 A1* | 6/2015 | Kumar | ................ | H04L 67/1046 709/205 |
| 2015/0172061 A1* | 6/2015 | Lee | ........................ | H04W 12/04 713/176 |
| 2016/0066353 A1* | 3/2016 | Kumar | ................ | H04W 12/06 709/227 |
| 2016/0095062 A1* | 3/2016 | Rabii | ................ | H04W 52/0229 370/311 |
| 2016/0124288 A1* | 5/2016 | Yang | ...................... | G03B 13/36 348/348 |
| 2016/0191501 A1* | 6/2016 | Li | ........................... | H04L 41/28 726/6 |
| 2016/0232393 A1* | 8/2016 | Nakajima | .......... | H04W 52/0229 |
| 2016/0265253 A1* | 9/2016 | Hild | ...................... | H04L 63/062 |
| 2016/0302054 A1* | 10/2016 | Kimura | ................. | H04W 8/005 |
| 2017/0013055 A1* | 1/2017 | Lim | ................. | H04L 67/1068 |
| 2017/0111788 A1* | 4/2017 | Cotta | .................... | H04L 9/0822 |
| 2017/0163329 A1* | 6/2017 | Dangy-Caye | ....... | H04L 12/2834 |
| 2017/0238164 A1* | 8/2017 | Pang | ..................... | H04W 8/005 455/41.3 |
| 2017/0295448 A1* | 10/2017 | McCann | ................. | H04L 63/06 |
| 2018/0020495 A1* | 1/2018 | Nakayama | ........... | H04W 12/08 |
| 2018/0249313 A1* | 8/2018 | She | ...................... | H04W 76/14 |
| 2019/0163415 A1* | 5/2019 | Takeuchi | ............ | H04N 1/00315 |
| 2019/0223238 A1* | 7/2019 | Takeuchi | ............... | H04W 76/10 |

FOREIGN PATENT DOCUMENTS

| | | | |
|---|---|---|---|
| CN | 103916978 A | 7/2014 | |
| CN | 104333888 A | 2/2015 | |
| CN | 104823517 A | 8/2015 | |
| EP | 2991434 A1 * | 3/2016 | ......... H04W 76/11 |
| JP | 2014-60623 A | 4/2014 | |
| JP | 2015-525550 A | 9/2015 | |
| WO | WO-2012167200 A1 * | 12/2012 | ......... H04L 63/0492 |
| WO | WO-2014190950 A1 * | 12/2014 | ............ H04W 76/10 |

* cited by examiner

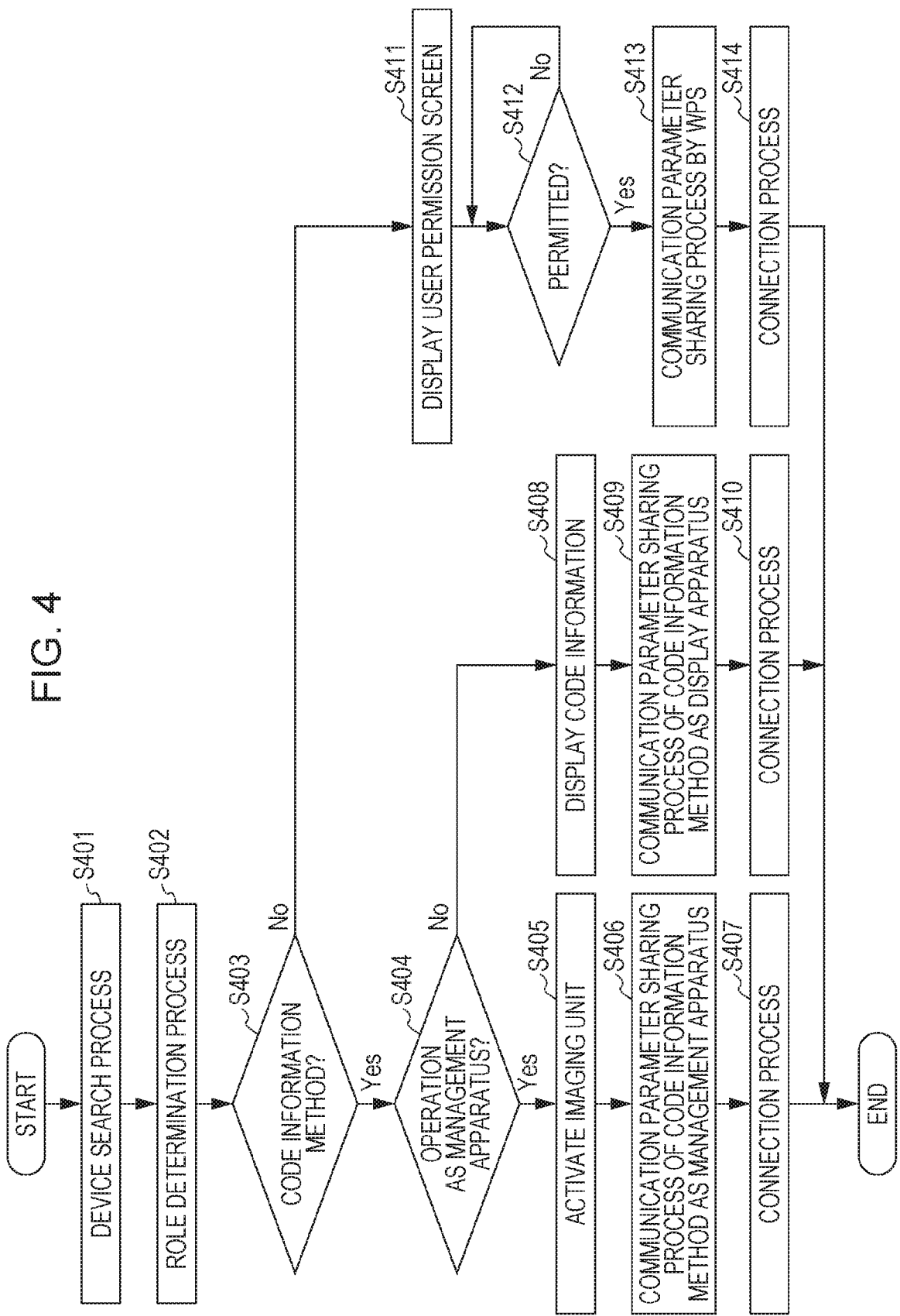

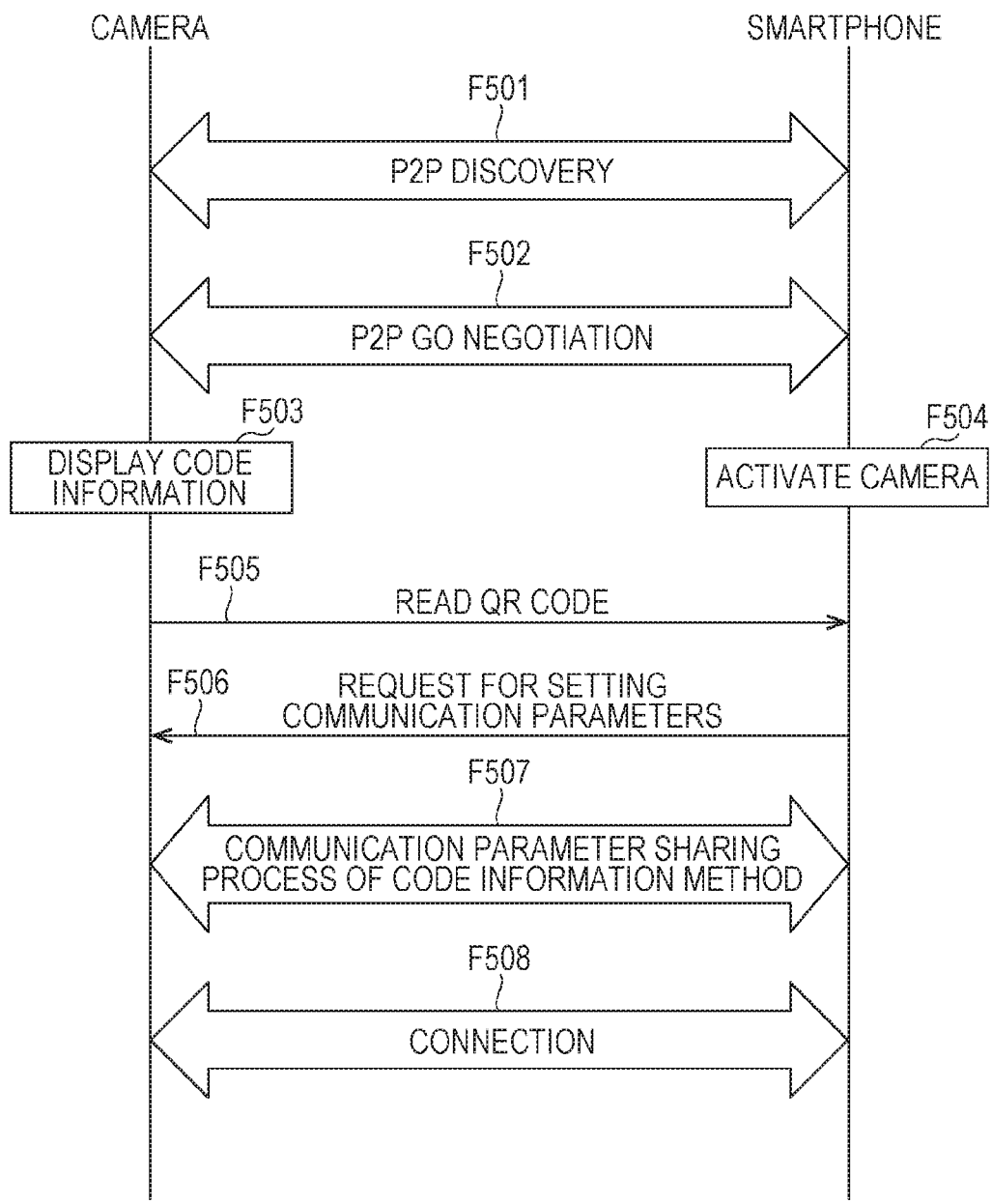

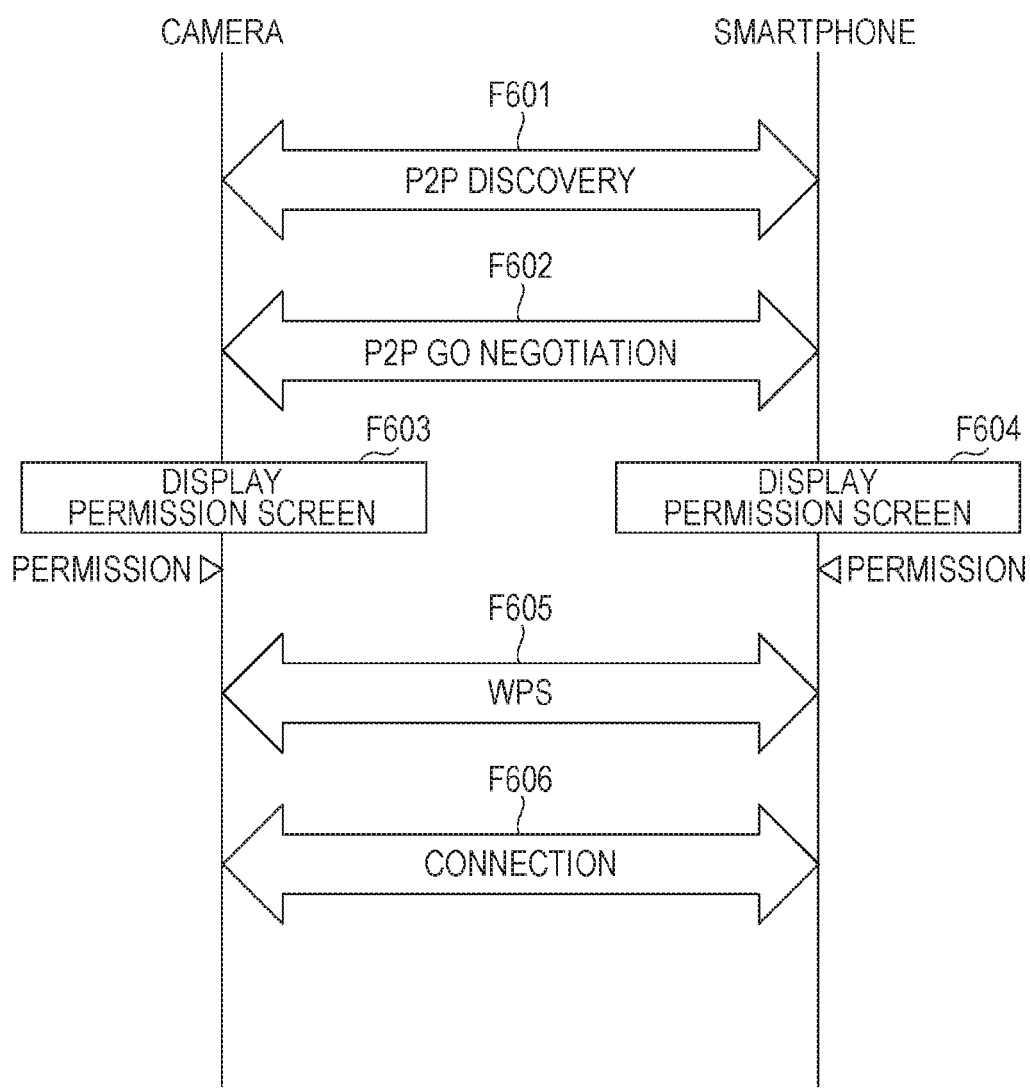

FIG. 7

| | OWN APPARATUS | | PARTNER APPARATUS | | PARAMETER SHARING PROCESS | MANAGEMENT APPARATUS |
|---|---|---|---|---|---|---|
| | CODE INFORMATION METHOD | IMAGING FUNCTION | CODE INFORMATION METHOD | IMAGING FUNCTION | | |
| 1 | AVAILABLE | AVAILABLE | AVAILABLE | AVAILABLE | CODE INFORMATION METHOD | DETERMINATION BY NEGOTIATION |
| 2 | AVAILABLE | AVAILABLE | AVAILABLE | UNAVAILABLE | CODE INFORMATION METHOD | OWN APPARATUS |
| 3 | AVAILABLE | UNAVAILABLE | AVAILABLE | AVAILABLE | CODE INFORMATION METHOD | PARTNER APPARATUS |
| 4 | AVAILABLE | UNAVAILABLE | AVAILABLE | UNAVAILABLE | WPS METHOD | — |
| 5 | UNAVAILABLE | UNAVAILABLE/AVAILABLE | UNAVAILABLE/AVAILABLE | UNAVAILABLE/AVAILABLE | WPS METHOD | — |
| 6 | UNAVAILABLE/AVAILABLE | UNAVAILABLE/AVAILABLE | UNAVAILABLE | UNAVAILABLE/AVAILABLE | WPS METHOD | — |

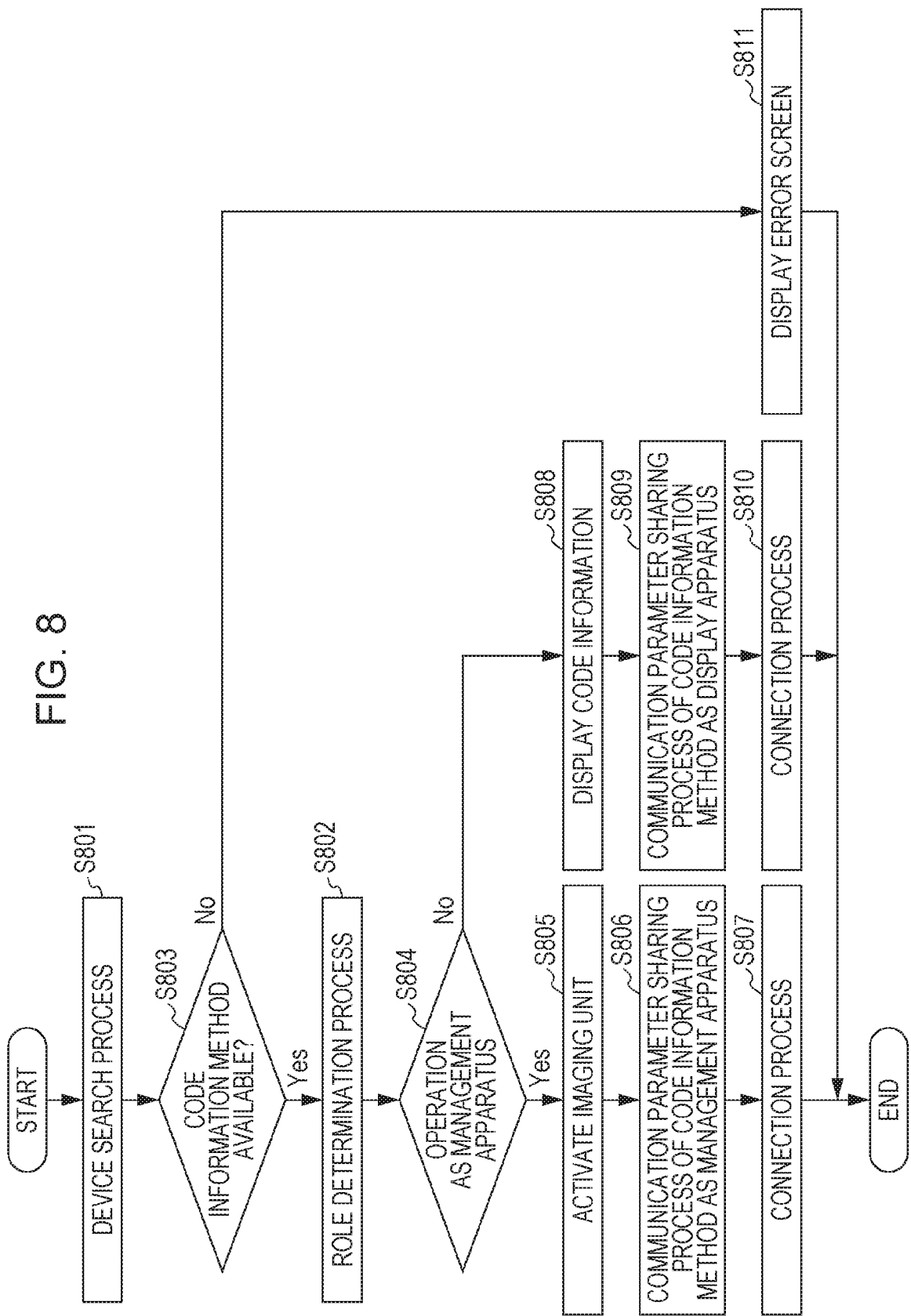

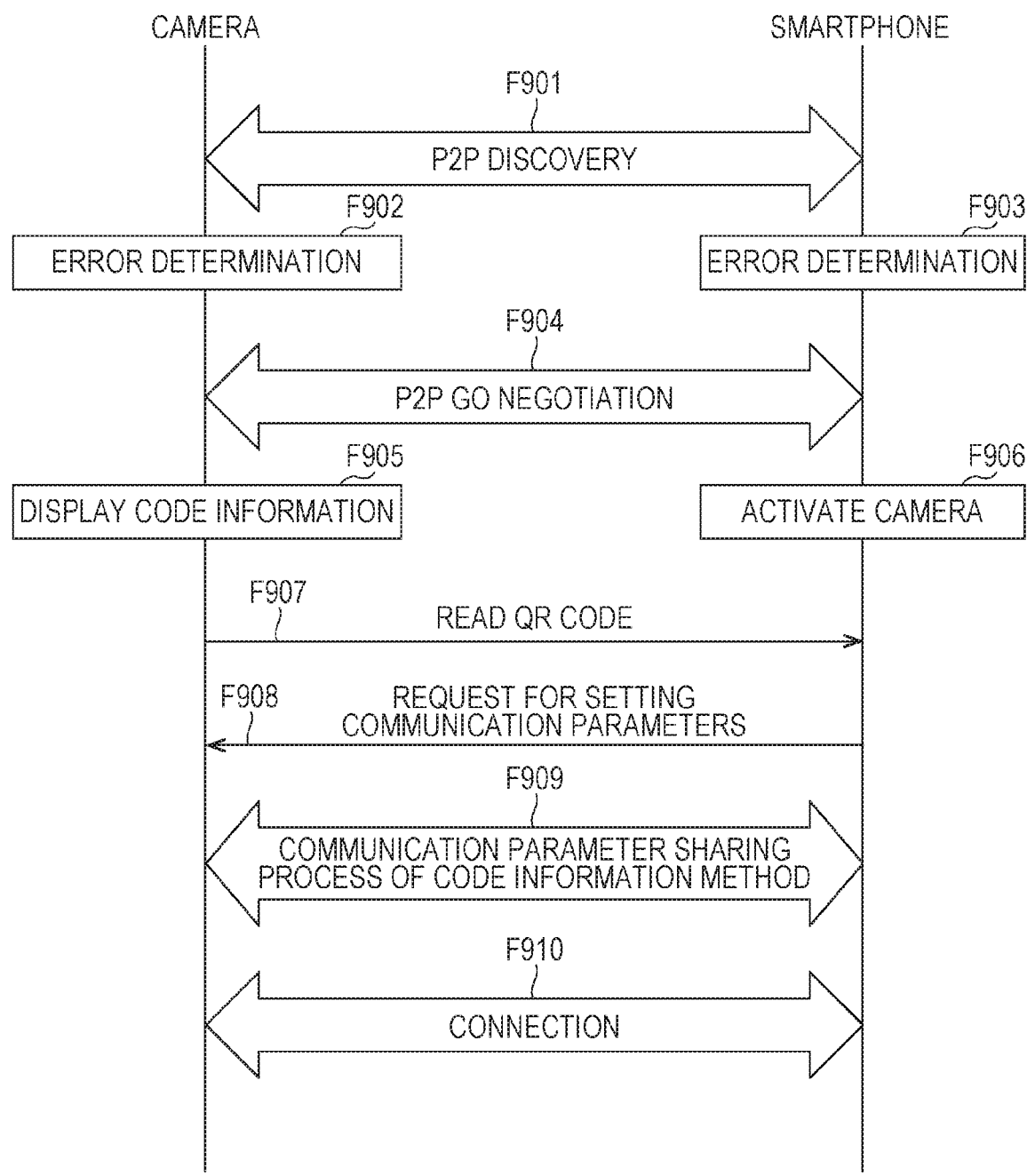

FIG. 10

| Bit(s) | Information |
|---|---|
| 0 | Service Discovery |
| 1 | P2P Client Discoverability |
| 2 | Concurrent Operation |
| 3 | P2P Infrastructure Managed |
| 4 | P2P Device Limit |
| 5 | P2P Invitation Procedure |
| 6 | Code Information Provisioning |
| 7 | Reserved |

FIG. 11

| Value | Configuration Methods |
|---|---|
| 0x0008 | Display |
| 0x0080 | Push Button |
| 0x0100 | Keypad |
| 0x1000 | Code Reader |
| 0x8000 | Display Code |

FIG. 12

| | OWN APPARATUS | | PARTNER APPARATUS | | PARAMETER SHARING PROCESS | MANAGEMENT APPARATUS |
|---|---|---|---|---|---|---|
| | CODE INFORMATION METHOD | IMAGING FUNCTION | CODE INFORMATION METHOD | IMAGING FUNCTION | | |
| 1 | AVAILABLE | AVAILABLE | AVAILABLE | AVAILABLE | CODE INFORMATION METHOD | DETERMINATION BY NEGOTIATION |
| 2 | AVAILABLE | AVAILABLE | AVAILABLE | UNAVAILABLE | CODE INFORMATION METHOD | OWN APPARATUS |
| 3 | AVAILABLE | UNAVAILABLE | AVAILABLE | AVAILABLE | CODE INFORMATION METHOD | PARTNER APPARATUS |
| 4 | AVAILABLE | UNAVAILABLE | AVAILABLE | UNAVAILABLE | ERROR | — |
| 5 | UNAVAILABLE | UNAVAILABLE/AVAILABLE | UNAVAILABLE/AVAILABLE | UNAVAILABLE/AVAILABLE | ERROR | — |
| 6 | UNAVAILABLE/AVAILABLE | UNAVAILABLE/AVAILABLE | UNAVAILABLE | UNAVAILABLE/AVAILABLE | ERROR | — |

COMMUNICATION APPARATUS, COMMUNICATION METHOD, AND PROGRAM

CROSS-REFERENCE TO RELATED APPLICATIONS

This application is a Continuation of International Patent Application No. PCT/JP2016/089089, filed Dec. 28, 2016, which claims the benefit of Japanese Patent Application No. 2016-007427 filed Jan. 18, 2016 and No. 2016-216633 filed Nov. 4, 2016, all of which are hereby incorporated by reference herein in their entirety.

TECHNICAL FIELD

The present invention relates to a communication technique.

BACKGROUND ART

In recent years, electronic apparatuses, such as digital still cameras, printers, cellular phones, and smartphones, having a wireless communication function have been used for connection to a wireless network.

When such an electronic apparatus is connected to a wireless network, various communication parameters including parameters of an encryption method, an encryption key, an authentication method, and an authentication key are set, PTL 1 discloses a technique of facilitating settings of such communication parameters. In PTL 1, an electronic apparatus displays a QR code (registered trademark) indicating communication parameters. Then a mobile terminal reads the QR code by imaging and sets the read communication parameters to an access point.

Furthermore, a connection process of Wi-Fi Direct (registered trademark) established by Wi-Fi Alliance for directly connecting electronic apparatuses to each other is defined as a standard. Wi-Fi Direct includes two roles, that is, a group owner operating as a base station and a client operating as a slave station. Each of the electronic apparatuses determines one of the roles in communication. Furthermore, Wi-Fi Direct, communication parameters are shared between the apparatuses using Wi-Fi Protected Setup (WPS).

CITATION LIST

Patent Literature

PTL 1 Japanese Patent Laid-Open No. 2014-60623

According to PTL 1, since communication parameters are set by imaging information on a code obtained by encoding a variety of information, such as a two-dimensional code, a number of complicated inputs to be performed by a user may be reduced.

However, in a technique of connection between apparatuses, such as Wi-Fi Direct, application of a method for sharing communication parameters by imaging as disclosed in PTL 1 is not taken into consideration.

SUMMARY OF INVENTION

A communication apparatus includes
a determination unit configured to determine whether the communication apparatus plays a role of capturing an image based on predetermined information indicating whether a communication partner apparatus plays the role of capturing an image in a communication parameter sharing process executed based on the predetermined information which is supplied from the communication partner apparatus so that wireless connection is established by Wi-Fi Direct and which is obtained from the captured image, and
a first sharing unit configured to execute the communication parameter sharing process with the communication partner apparatus in the role determined by the determination unit and share communication parameters used to establish wireless connection,
wherein the communication apparatus establishes the wireless connection with the communication partner apparatus by Wi-Fi Direct based on the communication parameters shared by the first sharing unit.

A communication apparatus includes
a first sharing unit configured to share communication parameters used to establish wireless connection with a communication partner apparatus by a communication parameter sharing process executed based on information obtained from a captured image,
a second sharing unit configured to execute communication based on a protocol defined by Wi-Fi Protected Setup (WPS) and share communication parameters used to establish wireless connection with the communication partner apparatus, and
a determination unit configured to determine whether the communication parameters are shared by the first sharing unit or the second sharing unit based on information transmitted to establish the wireless connection by Wi-Fi Direct,
wherein the communication apparatus establishes wireless connection with the communication partner apparatus by Wi-Fi Direct based on the communication parameters shared by the first sharing unit or the second sharing unit determined by the determination unit.

A communication apparatus includes
a determination unit configured to determine whether a communication partner apparatus is capable of executing a communication parameter sharing process based on a captured image in accordance with information supplied from the communication partner apparatus so that wireless connection is established by Wi-Fi Direct, and
a first, sharing unit configured to execute the communication parameter sharing process with the communication partner apparatus so as to snare communication parameters used to establish wireless connection when the determination unit determines that the communication parameter sharing process is executable by the communication partner apparatus,
wherein the communication apparatus establishes wireless connection with the communication partner apparatus by Wi-Fi Direct based on the communication parameters shared by the first sharing unit.

Further features of the present invention will become apparent from the following description of exemplary embodiments with reference to the attached drawings.

BRIEF DESCRIPTION OF DRAWINGS

FIG. 4 is a flowchart of an operation of a camera.

FIG. 5 is a diagram of a sequence between communication apparatuses.

FIG. 6 is a diagram of a sequence between the communication apparatuses.

FIG. 7 is a diagram illustrating a criterion for determining whether a code information method is to be employed and whether a role of a management apparatus is to be performed.

FIG. 8 is a flowchart of operation of a camera.

FIG. 9 is a diagram illustrating a sequence between communication apparatuses.

FIG. 10 is a diagram illustrating a configuration of a field indicating whether the code information method is supported.

FIG. 11 is a diagram illustrating a configuration of a field indicating whether an imaging function and a display function of the code information method are available.

FIG. 12 is a diagram illustrating a criterion for determining whether the code information method is to be employed and whether a role of a management apparatus is to be performed.

DESCRIPTION OF EMBODIMENTS

In embodiments below, a method using information obtained from an image when communication parameters are shared is employed in Wi-Fi Direct.

Hereinafter, a communication apparatus according to this embodiment will be described in detail with reference to the accompanying drawings. Hereinafter, a case where a wireless LAN system based on the Institute of Electrical and Electronics Engineers, Inc. (IEEE) 802.11 series is employed will be described as an example. However, it is not necessarily the case that a wireless LAN based on IEEE 802.11 is employed as a communication form.

Figure 3:
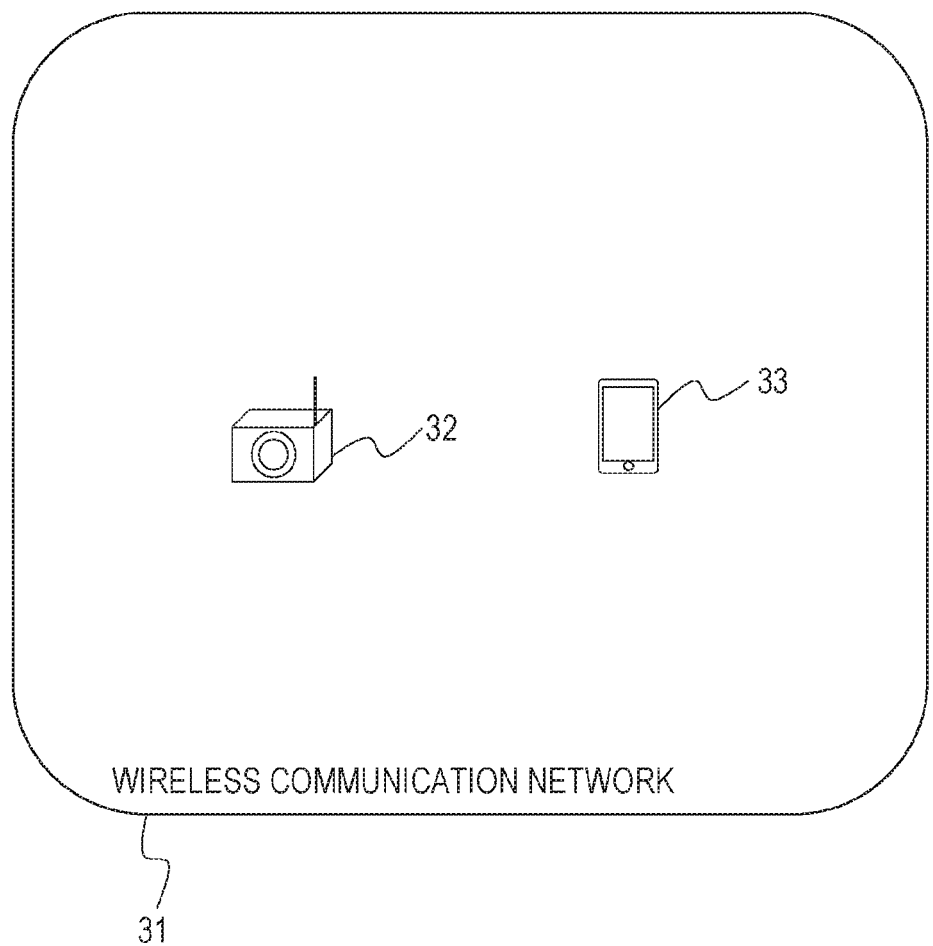
FIG. 3 is a diagram illustrating an example of a configuration of a communication system.

FIG. 3 is a diagram illustrating a communication system according to this embodiment. The communication system of FIG. 3 includes a camera 32 and a smartphone 33. Note that a wireless network 31 is a wireless local area network (LAN) constituted by the camera 32 or the smartphone 33 based on Wi-Fi Direct. Although a description will be made provided that a camera and a smartphone correspond to apparatuses in the communication system of this embodiment, other apparatuses, such as a printer, a cellular phone, a personal computer (PC), a video camera, a smart watch, and a portable digital assistance (PDA) may be employed.

Here, Wi-Fi Direct will be described. Wi-Fi Direct is a communication standard defined by Wi-Fi Alliance. In Wi-Fi Direct, a process of searching for a communication partner and a method for determining roles of an own apparatus and the communication partner and the like are defined and a connection sequence for wireless LAN communication is specified.

In Wi-Fi Direct, a communication apparatus operating as a wireless LAN access point is determined as a P2P group owner (hereinafter referred to as "GO") and a communication apparatus operating as a wireless LAN station is determined as a P2P client (hereinafter referred to as "CL"). Specifically, in Wi-Fi Direct, GO operates as a base station and CL operates as a slave station. These roles are determined by a GO Negotiation protocol. The GO Negotiation protocol is defined by Wi-Fi Direct. In Wi-Fi Direct, a plurality of roles are defined as described above. Wi-Fi Direct is a connection process for establishing wireless connection including a process of determining roles of apparatuses at a time of communication.

Note that a network constituted by GO is referred to as a P2P group in Wi-Fi Direct. The network may be referred to as a P2P group where appropriate also in this embodiment. Both indicate the same meaning.

Note that, in this embodiment, GO, CL, and a group of communication apparatuses in which roles thereof have not been determined are collectively referred to as "P2P devices". The communication apparatuses in which the roles thereof have not been determined may join a wireless network as CLs or may constitute a wireless network as GOs depending on a result of a role determination process described below.

Furthermore, in a case where apparatuses are to be connected to each other using Wi-Fi Direct, communication parameters are supplied from GO to CL and the connection is established using the communication parameters. The communication parameters include various wireless communication parameters to be used in wireless communication based on the IEEE 802.11 standard. Specifically, the communication parameters include wireless communication parameters required to perform wireless LAN communication, such as an SSID serving as a network identifier, an encryption method, an encryption key, an authentication method, a network key, and an authentication key. Furthermore, a MAC address and an IP address and the like for performing communication may be included.

Figure 1:
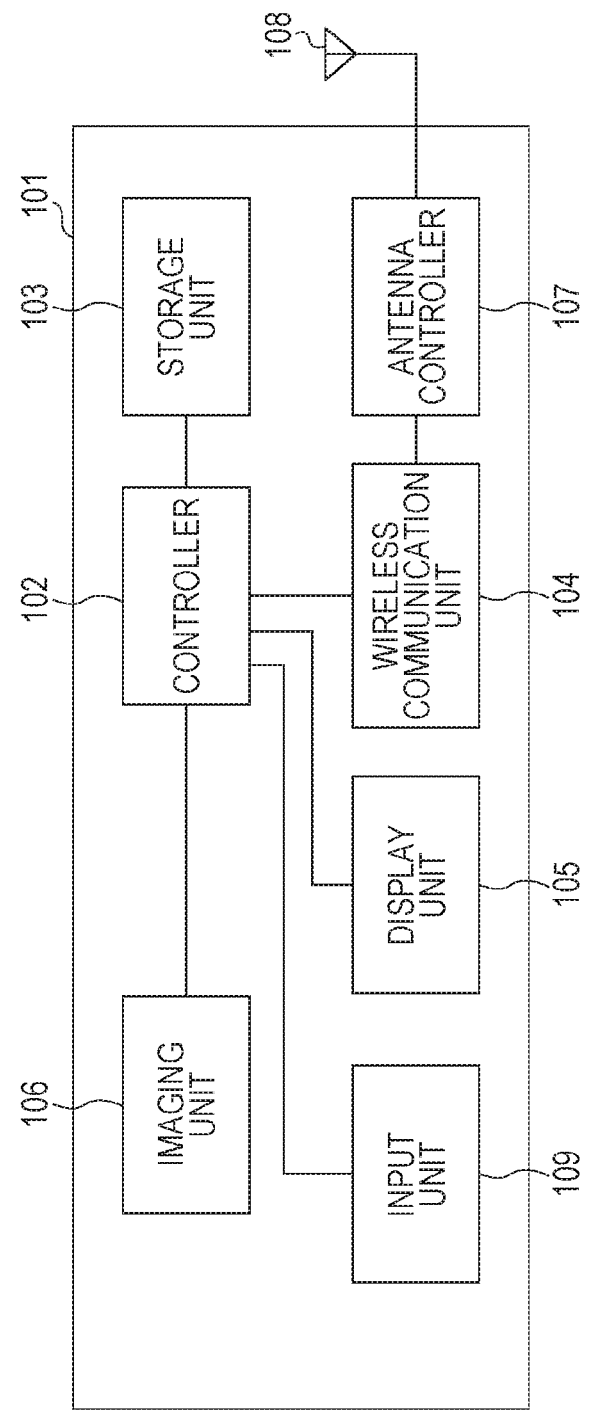
FIG. 1 is a diagram illustrating a configuration of a communication apparatus.

Subsequently, a hardware configuration of the apparatuses (that is, the camera 32 and the smartphone 33) illustrated in FIG. 3 according to this embodiment will be described with reference to FIG. 1. In FIG. 1, a reference numeral 101 indicates each of the entire apparatuses. A controller 102 controls the entire apparatus by executing control programs stored in a storage unit 103. The controller 102 is constituted by a central processing unit (CPU), for example. The storage unit 103 stores various information including the control programs to be executed by the controller 102, image data, and the communication parameters. Various operations described below are performed when the controller 102 executes the control programs stored in the storage unit 103. The storage unit 103 is constituted by a storage medium, such as a hard disk drive (HDD), a flash memory, a read only memory (ROM), a random access memory (RAM), or a detachable SD card.

A wireless unit 104 performs the wireless LAN communication based on the IEEE 802.11 series. The wireless unit 104 is constituted by a chip for performing the wireless communication. A display unit 105 has a function of outputting information recognizable by eyes, such as a function of a liquid crystal display (LCD) or a light emitting diode (LED), or a function of outputting sound, such as a function of a speaker. The display unit 105 has a function of outputting at least one of visual information and sound information. In a case where the display unit 105 displays visual information, the display unit 105 has a video RAM (VRAM) which stores image data corresponding to the visual information to be displayed. The display unit 105 performs display control for continuously displaying image data stored in the VRAM.

An imaging unit 106 including an imaging element and a lens performs imaging of photographs and shooting of moving images. In this embodiment, the imaging unit 106 reads code information, such as a one-dimensional code including a barcode, a two-dimensional code including a CP code and a QR code, and the like.

An antenna controller 107 controls output of an antenna 108. The antenna 108 is available for communication in a 2.4 GHz band, and/or 5 GHz band through a wireless LAN. An input unit 109 is used by a user to perform various inputs and operate the communication apparatus 101. The input unit 109 stores a flag corresponding to an input in a memory, such as the storage unit 103.

Figure 2:
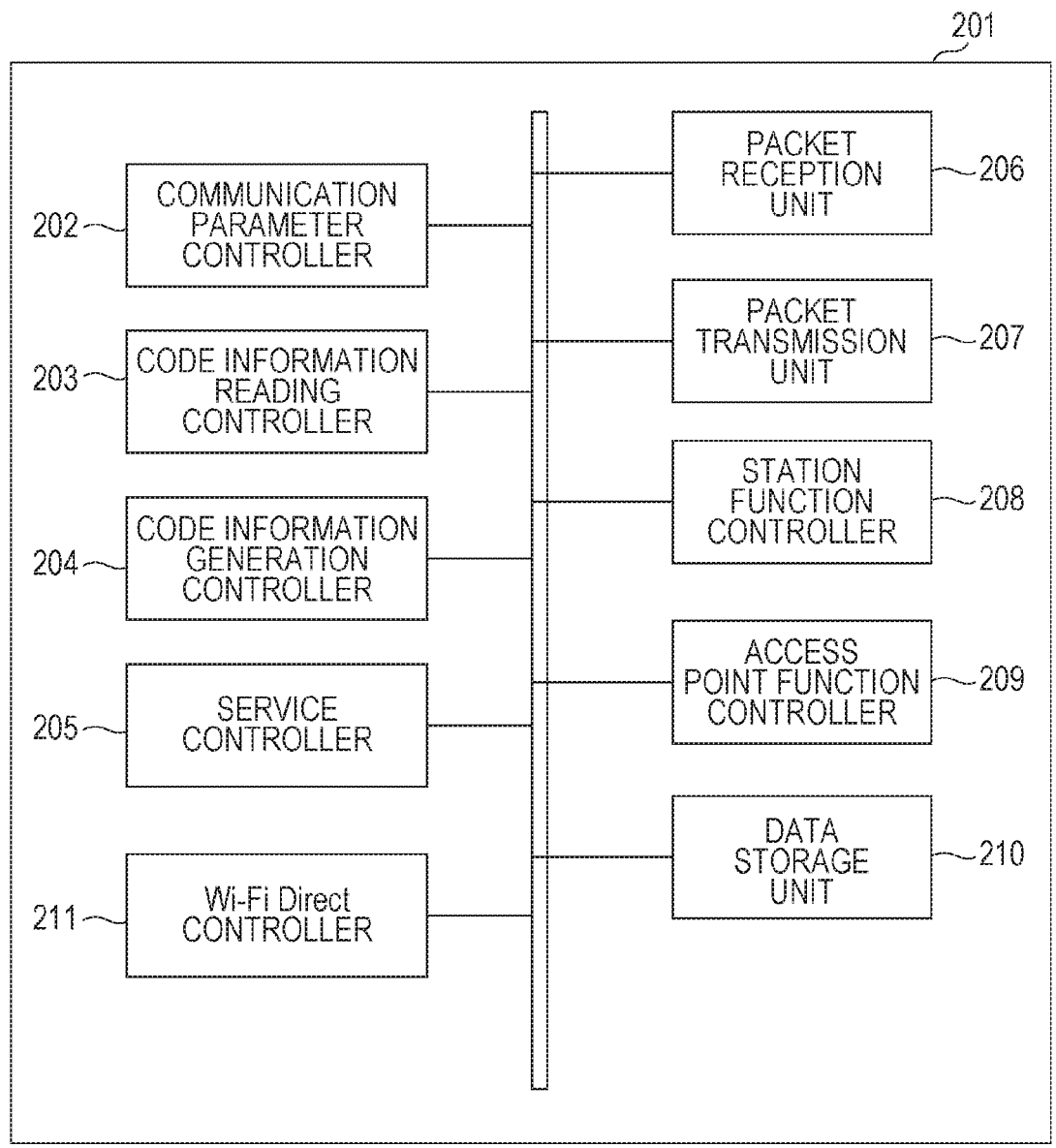
FIG. 2 is a diagram illustrating a configuration of a software function of the communication apparatus.

FIG. 2 is a block diagram illustrating an example of a configuration of software functional blocks to execute a communication control function described below. In this embodiment, the functional blocks of the apparatuses are individually stored in the storage unit 103 as programs, and functions thereof are executed when the controller 102 executes the programs. The controller 102 realizes the functions by controlling various types of hardware and by performing calculations and processes on information. Note that some or all of the functional blocks may be configured as hardware. In this case, some or all of the functional blocks are constituted by an application specific integrated circuit (ASIC), for example.

In FIG. 2, a reference numeral 201 indicates an entire software functional block. A communication parameter controller 202 executes a communication parameter sharing process for sharing the communication parameters between the apparatuses. In the communication parameter sharing process, wireless communication for a receiver apparatus. Here, the communication parameters include wireless communication parameters required to perform wireless LAN communication, such as an SSID serving as a network identifier, an encryption method, an encryption key, a network key, an authentication method, and an authentication key. Furthermore, a MAC address, a passphrase, an IP address for communication in an IP layer, and information required for a higher service may be included. The communication parameter sharing process executed by the communication parameter controller 202 uses Wi-Fi Protected Setup (WPS) defined by Wi-Fi Alliance. In WPS, a protocol for transmitting and receiving the communication parameters which is referred to as a registration protocol is defined. The communication parameter controller 202 executes the communication parameter sharing process based on the registration protocol. Note that, in a description below, the communication parameter sharing process executed based on the registration protocol defined by WPS is simply referred to as WPS where appropriate.

Furthermore, the communication parameter sharing process executed by the communication parameter controller 202 employs the code information method performed using information obtained from an image obtained by imaging code information. The communication parameter controller 202 executes the communication parameter sharing process in a connection process in Wi-Fi Direct by selecting one of WPS and the code information method.

Furthermore, the communication parameter sharing process executed by the communication parameter controller 202 may employ a method for securely transferring the communication parameters using a public key encryption method. The communication parameter controller 202 performs a setting of the communication parameters in accordance with a communication parameter setting application used to set the communication parameters stored in the storage unit 103.

A code information reading controller 203 analyzes an image captured by the imaging unit 106 so as to obtain encoded information. The code information reading controller 203 performs an analysis process on code information including a one-dimensional code, such as a barcode, and a two-dimensional code, such as a CP code or a QR code.

A code information generation controller 204 generates code information including a one-dimensional code, such as a barcode, and a two-dimensional code, such as a CP code or a QR code, and controls display of the generated code information in the display unit 105. The code information generation controller 204 displays the code information, such as a QR code, obtained by encoding information required for a setting of the communication parameters in accordance with the communication parameter setting application used to set the communication parameters stored in the storage unit 103.

A service controller 205 is included in an application layer. Here, the application layer indicates a service provision layer in a higher layer which is not lower than a fifth layer in the OSI reference model. Specifically, the service controller 205 executes a print process, an image streaming process, a file transfer process, and the like through the wireless communication using the wireless unit 104.

A packet reception unit 206 and a packet transmission unit 207 control transmission and reception of packets, respectively, including communication protocols in higher layers. Furthermore, the packet reception unit 206 and the packet transmission unit 207 controls the wireless unit 104 used for transmission and reception of packets based on the IEEE 802.11 standard between a pair of apparatuses.

A station function controller 208 provides a station (STA) function for operating as a station in an infrastructure mode defined by the IEEE 802.11 standard. The STA function controller 208 executes an authentication/encryption process and the like when operating as STA. Furthermore, an AP function controller 209 provides an AP function operating as an access point (AP) in the infrastructure mode defined by the IEEE 802.11 standard. The AP function controller 209 forms a wireless network and performs an authentication/encryption process on STA, management of STA, and the like. A data storage unit 210 controls software and writing and reading of information on the communication parameters and barcodes on the storage unit 103.

A Wi-Fi direct controller 211 performs various processes based on Wi-Fi Direct described above. When operating as GO, the Wi-Fi direct controller 211 functions as an AP under control of the AP function controller 209 whereas when operating as CL, the Wi-Fi direct controller 211 functions as STA under control of the STA function controller 208.

Operation of the communication system configured as described above will now be described. FIG. 4 is a flowchart illustrating a flow of a process performed when the controller 102 reads and executes a computer program of the flowchart of FIG. 4 may be realized by hardware, such as an ASIC. Note that, although a process performed by the camera 32 is described hereinafter, the smartphone 33 may execute the same process.

A communication parameter setting mode is set to the camera 32 by a user operating the input unit 109, and in addition, the camera 32 performs a device search process (P2P Discovery) defined by Wi-Fi Direct (S401). When a partner apparatus (the smartphone 33 in this embodiment) is detected by the device search process, a role determination process defined by Wi-Fi Direct is performed (S402). In the role determination process, the camera 32 performs a negotiation with the partner apparatus so as to determine whether the camera 32 operates as GO or CL. In the role determination process, a GO Negotiation Request frame, a GO Negotiation Response frame, and a GO Negotiation Confirmation frame are transmitted and received between the apparatuses. Here, a P2P IE which is an information element (IE) indicating Wi-Fi Direct and a WSC IE which is an IE indicating WPS are assigned to these frames. When the code information method which is a communication parameter sharing process using code information is supported, an IE indicating that the communication parameter sharing process of the code information method is supported is assigned to these frames. It is assumed here that one of the apparatuses which images code information operates as GO in this embodiment.

The camera 32 determines whether the partner apparatus supports the communication parameter sharing process of the code information method, in accordance with a determination as to whether an IE indicating that the code information method is supported is included in information received from the partner apparatus in Wi-Fi Direct (S403). In addition, a value indicating whether an imaging function is available is assigned to the same IE. The camera 32 is capable of determining whether the partner apparatus is capable of performing a role of imaging of the code information (which is referred to as a management apparatus) based on information indicating whether an imaging function is available in a predetermined IE which is included in the information received from the partner apparatus.

Note that an IE indicating that the code information method is supported may be assigned to, in addition to the frames transmitted and received in the role determination process, other frames. The IE indicating that the code information method is supported may be assigned to a Probe Request/Response frame and a Provision Discovery Request/Response frame. Furthermore, the IE indicating that the code information method is supported may be assigned to a Service Discovery Query/Response frame and a P2P Invitation Request/Response frame. Furthermore, the IE indicating that the code information method is supported may be assigned to a frame transmitted and received in the apparatus searching process, for example. Furthermore, information indicating that the code information method is supported and information indicating whether operation as a management apparatus is available may be assigned to a P2P IE.

Note that, when the communication parameter sharing process of the code information method is supported by both the apparatuses, the camera 32 may cause the user to determine whether the communication parameter sharing process of the code information method is to be executed. When execution of the communication parameter sharing process of the code information method is instructed by an input performed using the input unit 109, the camera 32 may proceed the process to step S404. Furthermore, when execution of the communication parameter sharing process using WPS is instructed by an input performed using the input unit 109, the camera 32 may proceed the process to step S411.

When it is determined that the code information method is available in step S403, the camera 32 determines whether to operate as a management apparatus. The determination is made by a method for determining whether the own apparatus and the partner apparatus have the imaging function as illustrated in a table of FIG. 7. For example, when the camera 32 has the imaging function but the partner apparatus does not nave the imaging function, the camera 32 is determined to operate as a management apparatus. Furthermore, when the camera 32 does not have the imaging function but the partner apparatus has the imaging function, the camera 32 does not operate as a management apparatus but operate as an apparatus which displays code information (a display apparatus). Furthermore, when the camera 32 does not have the imaging function and the partner apparatus does not have the imaging function, it is determined that both the apparatuses only serve as the display apparatus, and the communication parameter sharing process of the code information method is not executed but WPS is executed.

When the camera 32 has the imaging function and the partner apparatus also has the imaging function, for example, the camera 32 determines whether to operate as a management apparatus through a negotiation with the partner apparatus. The negotiation with the partner apparatus may be performed based on an Intent value used in the role determination process, for example. For example, an apparatus having a larger Intent value may operate as a management apparatus.

Note that, when it is determined that the camera 32 operates as a management apparatus since the partner apparatus does not have the imaging function, it may be determined that the camera 32 operates as GO irrespective of a magnitude of the Intent value. Furthermore, when it is determined that the camera 32 operates as a management apparatus in accordance with information transmitted in the device search process, the camera 32 may perform a negotiation while a largest Intent value is set so that the camera 32 operates as GO in the role determination process. Furthermore, when it is determined that the camera 32 operates as a display apparatus in accordance with information transmitted in the device search process, the camera 32 may perform a negotiation while a smallest Intent value is set so that the camera 32 operates as CL in the role determination process. Furthermore, when it is determined that the camera 32 executes the code information method and operates as a management apparatus in accordance with the information transmitted in the device search process, the role determination process may be omitted and it may be determined that the camera 32 operates as GO.

When it is determined that the camera 32 operates as a management apparatus in step S404, the camera 32 activates the imaging unit 106 (S405). Furthermore, the camera 32 may cause the display unit 105 to perform display for prompting the user to image the code information of the partner apparatus. Furthermore, the camera 32 starts operation as GO.

When the code information of the partner apparatus is imaged in accordance with a user operation, the camera 32 executes the communication parameter sharing process based on information obtained from, an image of the code information obtained by the imaging and supplies the communication parameters to the partner apparatus (S406). Note that the camera 32 may transmit information indicating that the imaging of the code information has been performed to the apparatus indicated by an identifier included in the code information by unicast. Furthermore, the information indicating that the code information has been imaged may be included in the captured code information. Furthermore, the information indicating that the code information has been imaged may be a hash value of information included in the imaged code information. Furthermore, in the communication parameter sharing process of the code information method, communication parameters encrypted based on the information included in the code information may be transmitted. When the communication parameter sharing process is completed, a process of connection to the partner apparatus is performed (S407).

When it is determined that the partner apparatus serves as a management apparatus in step S404, the display unit 105 displays the code information including information required for setting the communication parameters embedded therein (S408). Examples of the information required for setting the communication parameters include encryption information for encrypting the communication parameters and an identifier of the apparatus, such as a MAC address or a UUID.

The camera 32 executes the communication parameter sharing process when receiving information indicating that the displayed code information has been imaged from the partner apparatus, and thereafter, receives the communication parameters from the partner apparatus (S409). Note that the information indicating that the displayed code information has been imaged may be included in the displayed code information. Alternatively, the information indicating that the displayed code information has been imaged may be a hash value of information included in the displayed code information. Furthermore, the received communication parameters may be encrypted based on information included in the code information displayed by the camera 32. When the communication parameter sharing process is completed, the camera 32 performs a process of connection to a partner apparatus as CL based on the received communication parameters (S410).

When it is determined that the code information method may not be performed in step S403, a screen for determining whether connection to the partner apparatus by Wi-Fi Direct is to be permitted by the user is displayed in the display unit 105 (S411). After the permission by the user is waited (S413) and it is determined that the connection has been permitted, the communication parameter sharing process is performed by communication based on a registration protocol defined by WPS (S413). When the communication parameter sharing process is completed, a process of connection to the partner apparatus is performed (S414).

A sequence of connection between the communication apparatuses, that is, the camera 32 and the smartphone 33, by Wi-Fi Direct using the code information is illustrated in FIG. 5. In FIG. 5, both the camera 32 and the smartphone 33 support the communication parameter sharing process of the code information method and have the imaging function. It is assumed here that an Intent value of the smartphone 33 used in the role determination process is larger.

When a communication parameter setting mode is instructed by the user, the camera 32 and the smartphone 33 perform the device search process (P2P Discovery) defined by Wi-Fi Direct (F501). Subsequently, the role determination process defined by Wi-Fi Direct is performed (F502). It is determined that both the camera 32 and the smartphone 33 support the communication parameter sharing process of the code information method in the role determination process. Furthermore, since both the camera 32 and the smartphone 33 have the imaging function, it is determined that the communication parameter sharing using the code information is available. The camera 32 determines that the smartphone 33 serves as a management apparatus in accordance with the Intent value used in the role determination process and displays the code information (F503). It is determined that the smartphone 33 serves as a management apparatus in accordance with the Intent value, and the smartphone 33 activates the imaging unit and prompts the user to image the code information displayed by the camera 32 (F504). After imaging the code information (F505), the smartphone 33 transmits a communication parameter setting request including information indicating that the code information has been imaged to the camera 32 which is identified by identification information included in the imaged code information (F506).

When it is determined that the smartphone 33 has imaged the displayed code information in accordance with the information included in the received, communication parameter setting request, the camera 32 executes the communication parameter sharing process of the code information method with the smartphone 33 (F507). Note that, in the communication parameter sharing process, communication parameters encrypted based on the information included in the displayed code information may be transmitted. The smartphone 33 operates as GO and the camera 32 operates as CL. The camera 32 is connected to the smartphone 3 based on the communication parameters obtained by the communication parameter sharing process (F508).

A sequence of connection between the communication apparatuses, that is, the camera 32 and the smartphone 33, by Wi-Fi Direct using WPS is illustrated in FIG. 6. In FIG. 6, it is assumed that the smartphone 33 supports the communication parameter sharing process of the code information method but the camera 32 does not support the communication parameter sharing process of the code information method. Furthermore, it is assumed that the Intent value of the smartphone used in the role determination process is larger.

F601 and F602 are the same as F501 and F502, respectively, and therefore, descriptions thereof are omitted. The camera 32 and the smartphone 33 determine that the camera 32 does not support the communication parameter sharing process of the code information method and determine that WPS is to be executed in the role determination process. Furthermore, each of the camera 32 and the smartphone 33 determines a role of GO or a role of CL based on the Intent value. Each of the camera 32 and the smartphone 33 displays a screen for determining whether connection by Wi-Fi Direct is to be permitted (F603 and F604). When detecting the permission by a press of a button performed by the user or the like, each of the camera 32 and the smartphone 33 performs the communication parameter sharing process by communication based, on the registration protocol defined by WPS (F605). F606 is the same as F506, and therefore, a description thereof is omitted.

According to this embodiment, a method using information obtained from an image when communication parameters are snared may be employed in Wi-Fi Direct. Furthermore, in Wi-Fi Direct, the communication parameter sharing process of the partner apparatus may be checked, and one of a plurality of methods of the communication parameter sharing process to be executed may be selected. Furthermore, one of the apparatuses serving as a management apparatus in the communication parameter sharing using the code information may be determined by determining whether the apparatuses have the imaging function, and security and usability may be improved.

Furthermore, according to this embodiment, information indicating whether the imaging function is available is transmitted and received between the apparatuses. Accordingly, the apparatuses which do not have the imaging function are prevented from being continuously executing the communication parameter sharing process using imaged code information, and accordingly, connection failure or execution of unrequired processes may be suppressed. Furthermore, according to this embodiment, when the communication parameter sharing process using imaged code information is executed, an apparatus which operates as a management apparatus which performs imaging and an apparatus which operates as a display apparatus which displays an image may be appropriately determined without overlapping by a negotiation between the two apparatuses.

Furthermore, according to this embodiment, when the communication parameter sharing process using imaged code information is employed in Wi-Fi Direct, connection to an apparatus which may perform only general WPS may be performed through Wi-Fi Direct. Accordingly, even in an environment in which an apparatus which may execute the communication parameter sharing process using imaged code information and an apparatus which may only perform general WPS are mixed, wireless connection between the apparatuses may be established by Wi-Fi Direct, and accordingly, usability is improved.

Next, a modification of operation of the camera 32 will be described with reference to the flowchart of FIG. 8. FIG. 8 is a flowchart illustrating a flow of a process performed when the controller 102 reads and executes a computer program stored in the storage unit 103. Note that some of or all steps of the flowchart of FIG. 8 may be realized by hardware, such as an ASIC. Note that, although a process performed by the camera 32 is described hereinafter, the smartphone 33 may execute the same process.

The communication parameter setting mode is set to the camera 32 by the user operating the input unit 109, and in addition, the camera 32 performs the device search process (P2P Discovery) defined by Wi-Fi Direct (S801).

In the device search process, a process of detecting a partner apparatus is performed using a Probe Request/Response frame. A value of P2P Capability Attribute in a P2P IE which may be assigned to the Probe Request/Response frame transmitted in the device search process in step S802 may indicate whether the code information method is supported. The camera 32 may identify whether the partner apparatus detected by the device search process using the value of P2P Capability Attribute supports the code information method. FIG. 10 is a diagram illustrating a value of Device Capability Bitmap of P2P Capability Attribute of this embodiment. When a value of bit 6 of Device Capability Bitmap is 1, it is determined that the code information method is supported. When the value of bit 6 is 0, it is determined that the apparatus corresponding to the value of bit 6 of 0 does not support the code information method.

Furthermore, in this case, the apparatus may include a WSC IE which may be assigned to the Probe Request/Response frame transmitted in the device search process in step S802. A value of Configuration Methods Attribute of a WSC IE may indicate whether the apparatuses have an imaging function and a display function. The camera 32 may determine whether the partner apparatus detected by the device search process has an imaging function and a display function using the value of Configuration Methods Attribute of the WSC IE. FIG. 11 is a diagram illustrating a value of Configuration Methods according to this embodiment. When a value of Configuration Methods Attribute is 0x1000, it is determined that the apparatus has a function of imaging code information. When a value of Configuration Methods Attribute is 0x8000, it is determined that the apparatus has a function of displaying code information. The value of Configuration Methods Attribute may indicate a plurality of functions by performing OR operation on Values indicating various functions.

The camera 32 determines whether the code information method may be performed with the partner apparatus detected by the device search process (S802). The determination is made by a method for determining whether the own apparatus and the partner apparatus support the code information method and whether the own apparatus and the partner apparatus have the imaging function as illustrated in a table of FIG. 12.

For example, when the camera 32 does not have the imaging function and the partner apparatus does not have the imaging function, it is determined that both the apparatuses only correspond to the display apparatus and the code information method is not available.

When it is determined that the code information method is not available (No in step S802), the camera 32 displays an error screen (S811) and terminates the process. Furthermore, when only one partner apparatus is detected, the camera 32 may display an error whereas when a plurality of partner apparatuses are detected, the camera 32 may continuously perform the process with an available one of the partner apparatuses.

When it is determined that the code information method is available (Yes in step S802), the camera 32 performs the role determination process with the partner apparatus (S803). In this embodiment, the role determination process (Group Owner Negotiation) defined by Wi-Fi Direct is performed. After performing the role determination process in step S803, the camera 32 performs a process (S804 to S810) which is the same as the process from step S404 to step S410.

A sequence of connection between the communication apparatuses, that is, the camera 32 and the smartphone 33, by Wi-Fi Direct using the code information is illustrated in FIG. 9. In FIG. 9, both the camera 32 and the smartphone 33 support the communication parameter sharing process of the code information method, and have the imaging function. Furthermore, the Intent, value of the smartphone used in the role determination process is larger.

When the communication parameter setting mode is instructed by the user, the camera 32 and the smartphone 33 perform the device search process (P2P Discovery) defined by Wi-Fi Direct (F901). Since the device search process is performed, the camera 32 and the smartphone 33 have determined whether to be available for the code information method and whether to have the imaging function.

Subsequently, the camera 32 and the smartphone 33 determine whether the code information method is available and performs an error determination (F902 and F903). In this example, both the camera 32 and the smartphone 33 support the code information method and have the imaging function, and therefore, the process is continued. The camera 32 and the smartphone 33 perform a process which is the same as the process from F503 to F509 (F904 to F910).

According to the process illustrated in FIGS. 8 and 9, the process is not performed with an apparatus which is not available for the code sharing method, and therefore, security is improved. Furthermore, since the determination as to whether the code sharing process is available is made in the device search process, a retry process may be easily performed when connection to only a device which is available for the code sharing method is to be realized.

Other Embodiments

According to the foregoing embodiment, Persistent Group defined by Wi-Fi Direct may be used. Furthermore, in this case, the apparatus operating as GO may perform a connection process of forming Persistent Group using Invitation defined by Wi-Fi Direct.

Furthermore, in the foregoing embodiment, the configuration in which the information used for the setting of the communication parameters are transmitted and received between the apparatuses using the imaging of the code information is described. However, instead of the imaging of the code information, wireless communication such as NFC or Bluetooth (registered trademark) may be used. Alternatively, wireless communication, such as the IEEE 802.11ad or TransferJet (registered trademark), may be used.

Note that not only code information displayed in the display unit but also code information attached in a form of a sticker or the like on a case of the communication apparatus may be employed. Furthermore, the code information to be read may be attached to an instruction manual or a wrapping, such as a cardboard used when the communication apparatus is sold. Furthermore, the code information may be a one-dimensional code, such as a barcode, or a two-dimensional code. Furthermore, the code information may be in a form readable by the user instead of information readable by a machine, such as a QR code.

Furthermore, although the case where the communication between the apparatuses are performed by wireless LAN communication based on the IEEE 802.11 in the embodiments described above, the present invention is not limited to this. For example, a wireless communication medium, such as a wireless USB, MBOA, Bluetooth (registered trademark), UWB, ZigBee, or NFC, may be used. Here, MBOA is abbreviation of Multi Band OFDM Alliance. Furthermore, examples of TJWB include a wireless USB, wireless 1394, and WINET.

According to the description above, a method using information obtained from an image when communication parameters are shared may be employed in Wi-Fi Direct.

The present invention may be realized by a process of supplying a program which realizes at least one of the functions described in the foregoing embodiments to a system or an apparatus through a network or a storage medium and reading and executing the program using at least one processor of a computer included in the system or the apparatus. Furthermore, the present invention may be realized by a circuit which realizes at least one of the functions (an ASIC, for example).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
one or more processors; and
one or more memories including instructions that, when executed by the one or more processors, cause the apparatus to
receive predetermined information indicating whether a communication partner apparatus has a function of capturing an image in a communication parameter sharing process for establishing wireless connection of Wi-Fi Direct;
determine whether the communication apparatus plays a role of capturing an image based on the received predetermined information,
wherein the communication apparatus determines that the communication apparatus plays the role of capturing an image based on negotiation with the communication partner apparatus using a predetermined value in a case where the received predetermined information indicates that the communication partner apparatus has the function, and the communication apparatus determines that the communication apparatus plays the role of capturing an image without the negotiation in a case where the received predetermined information indicates that the communication partner apparatus does not have the function; and
execute a communication parameter sharing process with the communication partner apparatus by capturing an image for establishing wireless connection of Wi-Fi Direct in a case where it is determined that the communication apparatus plays the role of capturing an image.

2. The communication apparatus according to claim 1, wherein the predetermined value is an Intent value which is information used to determine a role in Wi-Fi Direct.

3. The communication apparatus according to claim 1, wherein the communication apparatus is determined to operate as a group owner in a case where the communication apparatus determines that the communication apparatus plays the role of capturing an image.

4. The communication apparatus according to claim 1 wherein execution of the instructions by the one or more processors further causes the communication apparatus to:
execute communication compliant with Wi-Fi Protected Setup (WPS) and share communication parameters used to establish wireless connection with the communication partner apparatus; and
determine, based on a negotiation with the communication partner apparatus, whether the communication parameters are shared by executing the communication parameter sharing process with the communication partner apparatus by capturing an image or Wi-Fi Protected Setup (WPS) for establishing wireless connection of Wi-Fi Direct.

5. The communication apparatus according to claim 1, wherein the image is obtained by imaging a barcode, a QR code, or a CP code.

6. The communication apparatus according to claim 1, wherein the communication parameters include at least one of an SSID, an encryption key, an encryption method, a network key, an authentication key, and an authentication method.

7. The communication apparatus according to claim 1, wherein the communication parameters are information for performing communication based on the IEEE 802.11 standard.

8. A communication method, comprising:
receiving predetermined information indicating whether a communication partner apparatus has a function of capturing an image in a communication parameter sharing process for establishing wireless connection of Wi-Fi Direct;
determining whether the communication apparatus plays a role of capturing an image based on the received predetermined information,
wherein the communication apparatus determines that the communication apparatus plays the role of capturing an image based on negotiation with the communication partner apparatus using a predetermined value in a case where the received predetermined information indicates that the communication partner apparatus has the function, and the communication apparatus determines that the communication apparatus plays the role of capturing an image without the negotiation in a case where the received predetermined information indicates that the communication partner apparatus does not have the function; and
executing a communication parameter sharing process with the communication partner apparatus by capturing an image for establishing wireless connection of Wi-Fi Direct in a case where it is determined that the communication apparatus plays the role of capturing an image.

9. A non-transitory storage medium that stores instructions which, when executed by one or more processors, causes a communication apparatus to perform a communication control method comprising:

receiving predetermined information indicating whether a communication partner apparatus has a function of capturing an image in a communication parameter sharing process for establishing wireless connection of Wi-Fi Direct;

determining whether the communication apparatus plays a role of capturing an image based on the received predetermined information, wherein the communication apparatus determines that the communication apparatus plays the role of capturing an image based on negotiation with the communication partner apparatus using a predetermined value in a case where the received predetermined information indicates that the communication partner apparatus has the function, and the communication apparatus determines that the communication apparatus plays the role of capturing an image without the negotiation in a case where the received predetermined information indicates that the communication partner apparatus does not have the function; and executing a communication parameter sharing process with the communication partner apparatus by capturing an image for establishing wireless connection of Wi-Fi Direct in a case where it is determined that the communication apparatus plays the role of capturing an image.

* * * * *